(12) United States Patent
Happes et al.

(10) Patent No.: US 11,190,568 B2
(45) Date of Patent: Nov. 30, 2021

(54) MULTIMEDIA COMMUNICATION ENCODING SYSTEM

(71) Applicant: Bose Corporation, Framingham, MA (US)

(72) Inventors: Marc Brandon Happes, Westford, MA (US); Marco Maurizio Panzanella, Northbridge, MA (US); Darryl John Bryans, Natick, MA (US)

(73) Assignee: Bose Corporation, Framingham, MA (US)

( * ) Notice: Subject to any disclaimer, the term of this patent is extended or adjusted under 35 U.S.C. 154(b) by 29 days.

(21) Appl. No.: 16/243,165

(22) Filed: Jan. 9, 2019

(65) Prior Publication Data

US 2020/0220915 A1 Jul. 9, 2020

(51) Int. Cl.
*G06F 15/16* (2006.01)
*H04L 29/06* (2006.01)
*G06F 13/20* (2006.01)

(52) U.S. Cl.
CPC ............ *H04L 65/607* (2013.01); *G06F 13/20* (2013.01); *H04L 65/403* (2013.01); *G06F 2213/0024* (2013.01); *G06F 2213/0042* (2013.01)

(58) Field of Classification Search
CPC ..... H04L 65/607; H04L 65/403; G06F 13/20; G06F 2213/0024; G06F 2213/0042
USPC .................................................. 709/224, 204
See application file for complete search history.

(56) References Cited

U.S. PATENT DOCUMENTS

| | | | | |
|---|---|---|---|---|
| 4,866,667 | A | * | 9/1989 | Shimada .................. G06F 13/22 710/316 |
| 8,547,995 | B2 | * | 10/2013 | Gelke .................. H04N 21/226 370/419 |
| 9,973,638 | B2 | | 5/2018 | Pring |
| 10,356,142 | B1 | * | 7/2019 | Rajagopalan ....... H04L 65/4076 |

(Continued)

OTHER PUBLICATIONS

"IEEE Standard for Media Management System (MMS) Media Management Protocol (MMP)," in IEEE Std 1244.3-2000 , vol., No., pp. 1-114, Dec. 15, 2000 (Year: 2000).*

(Continued)

*Primary Examiner* — Jeffrey R Swearingen
*Assistant Examiner* — Messeret F Gebre
(74) *Attorney, Agent, or Firm* — Hoffman Warnick LLC (57) ABSTRACT

Various implementations include devices and approaches for managing multimedia communications. In one aspect, a computer-implemented method of controlling a device connection includes: receiving audio data and video data from an input device connected with a peripheral bus input port; converting the audio data for transmission over an audio over internet protocol (IP) connection or a balun connection and converting the video data for transmission over a video over internet protocol (IP) connection or the balun connection; and transmitting the converted audio data and the converted video data for decoding and output to at least one output device via a multimedia audiovisual interface output port, where the peripheral bus input port is configured to support bidirectional audio and bidirectional video exchange with the input device and bidirectional exchange of IP-based control signals or balun-based control signals with the input device.

20 Claims, 4 Drawing Sheets

(56) References Cited

U.S. PATENT DOCUMENTS

| | | | | |
|---|---|---|---|---|
| 2004/0196836 A1* | 10/2004 | Takahashi | ............. | H04M 7/006 |
| | | | | 370/352 |
| 2006/0171378 A1* | 8/2006 | Harris | ............... | H04L 29/06027 |
| | | | | 370/352 |
| 2006/0171565 A1* | 8/2006 | Takahashi | .............. | H04N 5/602 |
| | | | | 382/105 |
| 2012/0162061 A1* | 6/2012 | Hildebrandt | ........ | G06F 3/03545 |
| | | | | 345/156 |
| 2013/0174208 A1* | 7/2013 | Lee | ................... | H04N 21/4122 |
| | | | | 725/109 |
| 2014/0003490 A1* | 1/2014 | Cho | ....................... | H04N 19/12 |
| | | | | 375/240.02 |
| 2014/0362171 A1* | 12/2014 | Wall | ...................... | H04N 7/147 |
| | | | | 348/14.12 |
| 2016/0205262 A1* | 7/2016 | Bao | ...................... | H04M 3/568 |
| | | | | 381/66 |
| 2016/0286260 A1* | 9/2016 | Lawrence | .......... | H04N 21/4307 |
| 2017/0303009 A1* | 10/2017 | Nakamura | ....... | H04N 21/23602 |
| 2018/0124128 A1* | 5/2018 | Faulkner | ............. | H04L 65/1093 |
| 2018/0146446 A1* | 5/2018 | Mate | ................... | H04L 65/4069 |
| 2019/0313130 A1* | 10/2019 | Zhang | ................. | H04N 19/463 |
| 2019/0369738 A1* | 12/2019 | Lee | ...................... | H04L 65/403 |

OTHER PUBLICATIONS

Wu, Y. (2008). Distributing layered content using network coding doi:http://dx.doi.org/10.1109/SAHCNW.2008.28 (Year: 2008).*

Xuxian Jiang, Yu Dong, Dongyan Xu and B. Bhargava, "GnuStream: a P2P media streaming system prototype," 2003 International Conference on Multimedia and Expo. ICME '03. Proceedings (Cat. No. 03TH8698), 2003, pp. II-325 (Year: 2003).*

\* cited by examiner

MULTIMEDIA COMMUNICATION ENCODING SYSTEM

TECHNICAL FIELD

This disclosure generally relates to communication systems. More particularly, the disclosure relates to approaches and related devices for processing audio and video data in a communication infrastructure.

BACKGROUND

In conventional multimedia communication systems, users connect one or more input devices to an array of connectors, cables and/or adapters to provide audio and video data to one or more output devices. In the instance of a conferencing system or content presentation system, a user with a portable electronic device such as a laptop computer, tablet, or smart device is often required to connect that portable electronic device to multiple input ports in order to effectively share audio and video data with other users or run a conference or presentation. This conventional configuration is unwieldy, inefficient and discouraging to users.

SUMMARY

All examples and features mentioned below can be combined in any technically possible way.

Various implementations include an encoder for a multimedia communications system. Additional implementations include a multimedia communications system with an encoder, a decoder and at least one connected output device. Additional implementations include a computer-implemented method of controlling a device connection.

Some particular aspects include an encoder for distributing multimedia communications signals. The encoder includes: a peripheral bus input port; a hub controller coupled with the peripheral bus input port; a processor coupled with the hub controller; and a multimedia audiovisual interface output port coupled with the processor, where the processor is configured to: receive audio data and video data from an input device connected with the peripheral bus input port, via the hub controller; convert the audio data for transmission over an audio over internet protocol (IP) connection or a balun connection and convert the video data for transmission over a video over IP connection or the balun connection; and transmit the converted audio data and the converted video data to at least one output device connected with the multimedia audiovisual interface output port, where the peripheral bus input port is configured to support bidirectional audio and bidirectional video exchange with the input device and bidirectional exchange of IP-based control signals or balun-based control signals with the input device.

Additional particular aspects include a system having: an encoder including: a peripheral bus input port; a hub controller coupled with the peripheral bus input port; a processor coupled with the hub controller; and a multimedia audiovisual interface output port coupled with the processor, where the processor is configured to: receive audio data and video data from an input device connected with the peripheral bus input port, via the hub controller; convert the audio data for transmission over an audio over internet protocol (IP) connection or a balun connection and convert the video data for transmission over a video over IP connection or the balun connection; and transmit the converted audio data and the converted video data to at least one output device, where the peripheral bus input port is configured to support bidirectional audio and bidirectional video exchange with the input device and bidirectional exchange of IP-based control signals or balun-based control signals with the input device; a decoder coupled with the multimedia audiovisual interface output port for decoding the converted audio data and the converted video data; and at least one output device coupled with the decoder for providing audio output and video output.

Further particular aspects include a computer-implemented method of controlling a device connection. The method can include: receiving audio data and video data from an input device connected with a peripheral bus input port; converting the audio data for transmission over an audio over internet protocol (IP) connection or a balun connection and converting the video data for transmission over a video over internet protocol (IP) connection or the balun connection; and transmitting the converted audio data and the converted video data for decoding and output to at least one output device via a multimedia audiovisual interface output port, where the peripheral bus input port is configured to support bidirectional audio and bidirectional video exchange with the input device and bidirectional exchange of IP-based control signals or balun-based control signals with the input device.

Implementations may include one of the following features, or any combination thereof.

In certain implementations, the balun connection includes an HDBaseT connection.

In some aspects, the audio over IP connection includes a Dante connection, and the video over IP connection is a transport connection.

In particular cases, the processor is further configured to send at least one of a wake command or a mute command to the at least one output device in response to detecting the connection with the input device at the peripheral bus input port.

In certain aspects, the processor is configured to simultaneously transmit the converted audio data and the converted video data to the at least one output device, via the multimedia audiovisual interface, in response to detecting a signal between the input device and the encoder at the peripheral bus input port.

In some implementations, the system further includes: an additional encoder; a network switch coupled with the encoder, the additional encoder, and the decoder; an audio processor coupled with the network switch, where the audio processor or the decoder includes a processing component that is configured, in response to detecting a connection with an additional input device at the additional encoder, to: receive additional audio data and additional video data from the additional input device connected with the additional encoder; convert the additional audio data for transmission over the audio over IP connection or the balun connection and convert the additional video data for transmission over the video over IP connection or the balun connection; and transmit the converted additional audio data and the converted additional video data to the at least one output device via the multimedia audiovisual interface output port in response to determining that the additional input device has priority over the input device.

In certain aspects, the converted audio data and the converted video data are transmitted simultaneously to at least one output device.

In some cases, priority between the input device and the additional input device is determined based upon at least one of: a seat location of the input device as compared with a seat location of the additional input device, an order of connection with the encoder, a predefined hierarchy of users associated with the input device and the additional input device, a connection method for the input device as compared with a connection method for the additional input device, a device type of the input device as compared with a device type of the additional input device, or presence of a static device connected to the encoder.

In particular aspects, the peripheral bus input port includes a peripheral component interconnect (PCI) or a universal serial bus (USB) input port.

In some implementations, the IP-based control signals or the balun-based control signals include at least one of human interface device (HID) control signals or USB video device class (UVC) control signals.

In certain cases, the converted video data is compressed for transmission over the video over IP connection or the balun connection at a rate of approximately one gigabit per second (Gbps) to approximately 100 Gbps.

In some aspects, the multimedia audiovisual interface output port includes a high definition multimedia interface (HDMI) output port, and the at least one output device includes an audio digital signal processor.

In some implementations, the set of output devices, the encoder and the decoder are all located in the same room.

In particular cases, the encoder is configured to control operation of the at least one output device via a software function or via an IP-based secondary control platform.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an encoder with a peripheral bus input port can be beneficially incorporated into a multimedia communications system for distributing multimedia signals. The devices, systems and related methods can significantly improve the user experience when compared with conventional multimedia communications systems.

Commonly labeled components in the FIGURES are considered to be substantially equivalent components for the purposes of illustration, and redundant discussion of those components is omitted for clarity.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

As noted herein, conventional multimedia communication systems can be unwieldy, inefficient and discouraging to users. For example, in bring-your-own-codec (BYOC) or bring-your-own-device (BYOD) configurations, one or more users host a presentation or otherwise share multimedia content using an array of different connectors, cables, adapters and device settings. In particular cases, when the presenting user enters a conference room and intends to share video content and/or audio content from that input device, as well as video content and/or audio content detected by camera(s) and/or microphones on the input device or in the conference room, the user is often forced to connect the input device using an Ethernet connection, a universal serial bus (USB) connection, and a high definition multimedia interface (HDMI) connection. That is, in order to effectively share audio data and video data in a multimedia presentation setting (e.g., a conference setting), the conventional systems require multiple device connections, and often require corresponding settings adjustments to manage these connections. Additionally, other steps may be required such as turning a display on, and/or selecting system input, etc., using a remote control. These additional steps, in combination with the conventional systems, are prone to user error as well as configuration errors.

In contrast to these conventional systems, various implementations include a system having an encoder for distributing multimedia communications signals using a peripheral bus input port. In various particular cases, the peripheral bus input port is configured to receive both audio data and video data, and the encoder is configured to convert this data for transmission to one or more output devices. In some cases, the encoder transmits the converted audio and video data to a decoder, which can be coupled with an output device such as a visual display, speaker system, etc.

Figure 1:
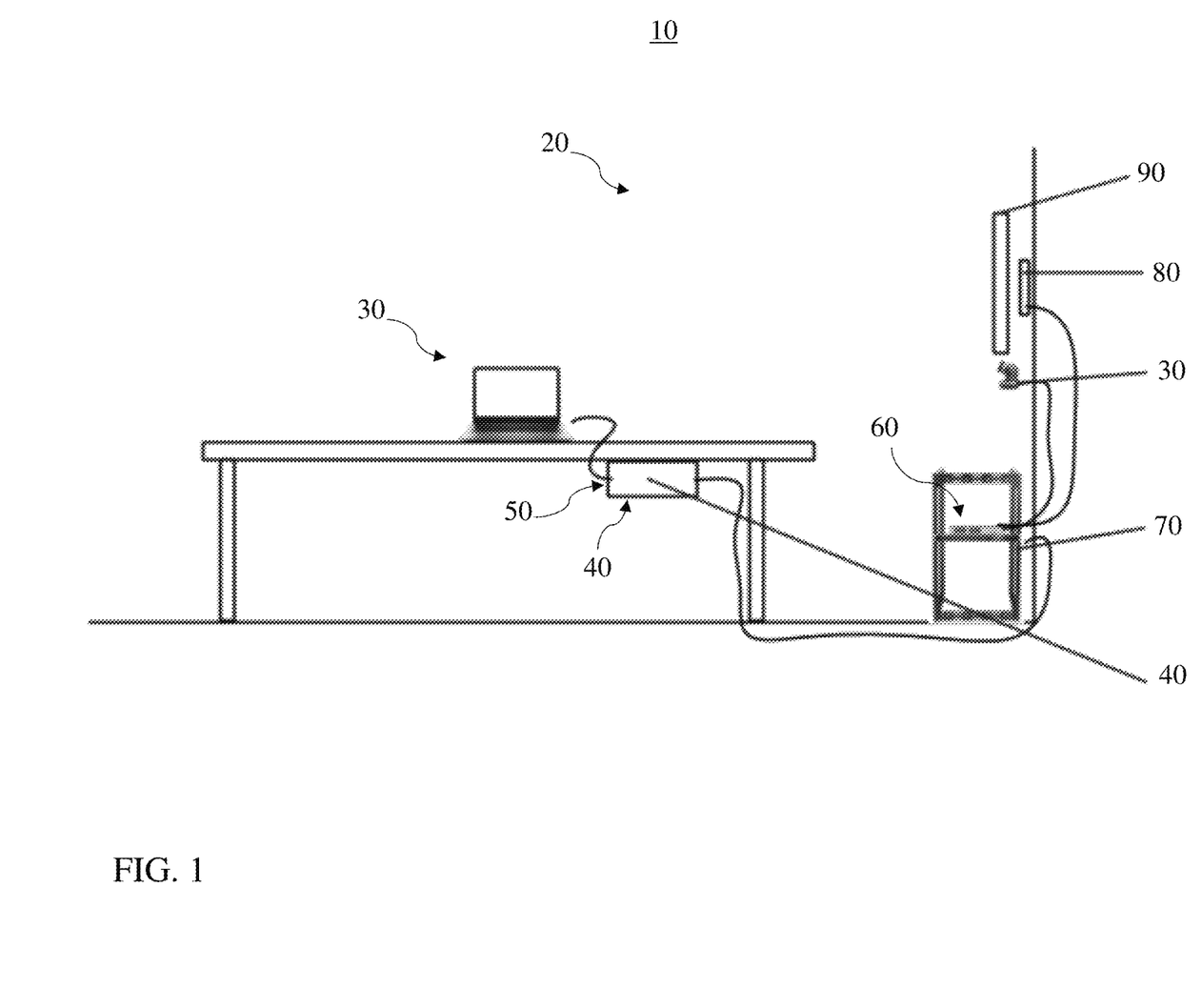
FIG. 1 is a schematic illustration of an environment including a system according to various implementations.

FIG. 1 is a schematic illustration of an environment 10 including a system 20 according to various implementations. As shown, the system 20 can include one or more input devices 30 connected with an encoder 40, for example, via a peripheral bus input connection. In various implementations, the encoder 40 is configured to distribute multimedia communications signals. Input devices 30 can include a computing device such as a personal computer or smart device (e.g., smartphone or tablet). Additional input devices 30 can include one or more microphones, camera(s) or other multimedia devices configured for network communication. A camera is shown as one of the input devices 30 in this example implementation. It is understood that various input devices 30 can be connected with the encoder 40 (or a plurality of encoders 40) according to various implementations.

In some cases, an input device 30 such as a computing device is connected with the encoder 40 by a peripheral bus input port 50, which can include, for example a peripheral component interconnect (PCI) input port or a universal serial bus (USB) input port. In various implementations, the peripheral bus input port 50 supports both audio and video data transmission to and from the input device 30 (e.g., computing device). In various implementations, the encoder 40 is integrated into a network switch 60, or is connected with a network switch 60 for communication with other devices in the system 20. The network switch 60 can be located in an audio-visual (AV) rack 70 or other housing. Also shown in FIG. 1 is a decoder 80 connected with the network switch 60, along with an output device 90 connected with the decoder 80 and/or the network switch 60. Additional details of the decoder 80 are described further herein.

The output device(s) 90 can include a display such as a computer system monitor, television screen, visual projection device, etc., an audio system such as one or more speakers, headphones/earphones, or a combined audio/visual output device such as a computing device having both a display and one or more integrated speakers. These are merely examples of output devices 90 that can be connected with the decoder 80 for performing functions according to various implementations. In the particular example depicted in FIG. 1, the output device(s) 90, encoder 40 and decoder 80 are all located in the same room, e.g., in the same physical room defined by fixed or movable walls. However, as described with reference to additional implementations herein, the output device(s) 90, encoder 40 and/or decoder 80 can be located in physically separate locations, e.g., different rooms in the same building. In some cases, the environment 10 depicts a BYOC or BYOD configuration, whereby a user can control communications between one or more input devices 30 and an output device 90 using his/her selected input device 30. In these scenarios, the computing device that acts as an input device is provided by the user, and in some cases, is the personal computing device (e.g., laptop, tablet or other smart device) belonging to or otherwise associated with that user.

Figure 2:
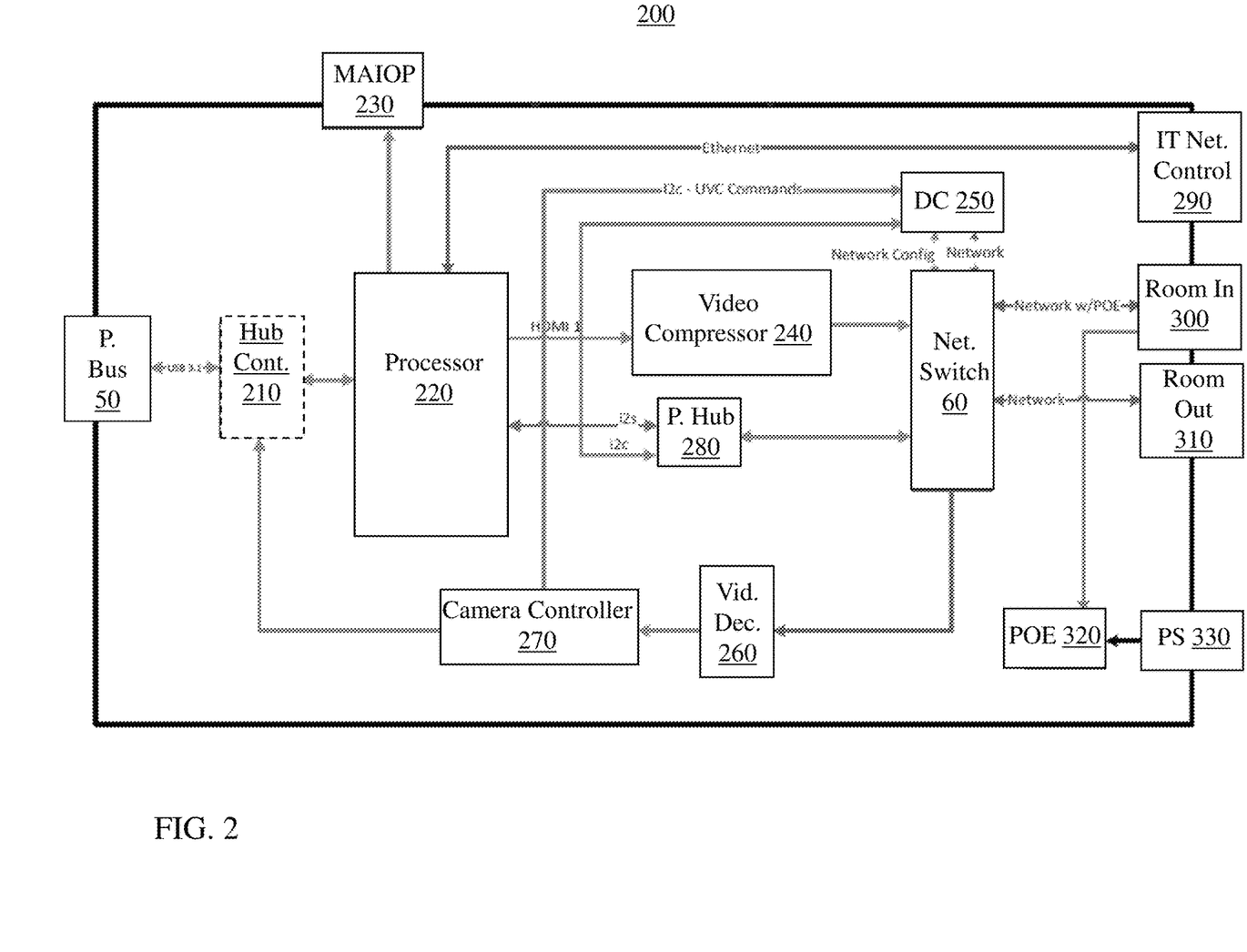
FIG. 2 is a schematic data flow diagram illustrating processes performed by an encoder according to various implementations.

FIG. 2 is a schematic data flow diagram 200 illustrating processes performed by the encoder 40, which can be a separate component from the network switch 60 (FIG. 1), or in other cases, may be integral with the network switch 60 (e.g., within the same physical housing). As described herein, the encoder 40 is configured to communicate with the input devices 30 and the output devices 90 shown and described with reference to FIG. 1. In various implementations, the encoder 40 includes the peripheral bus input port 50, or is otherwise directly connected (e.g., via hard wire) with the peripheral bus input port 50. In some implementations, the encoder 40 also includes a hub controller 210 coupled with the peripheral bus input port 50, a processor 220 coupled with the hub controller 210, and a multimedia audiovisual interface output port (MAIOP) 230 coupled with the processor 220. However, in other implementations, the encoder 40 does not include the hub controller 210 (indicated as optional by dashed lines), and the peripheral bus input port 50 is directly coupled with the processor 220. Additional components in the encoder 40 can perform conventional functions, and as such, are referred to with less specificity. Connections between components in the data flow diagram in FIG. 2 can represent hard-wired connections, and in various implementations, components in the encoder 40 are contained in the same housing. In particular implementations, components in the encoder 40 are self-contained in a single housing, e.g., for connection with one or more components in the system 20 (FIG. 1).

As noted herein, the peripheral bus input port (or simply, peripheral bus) 50 is configured to receive multimedia communications inputs, e.g., both audio data and video data, from one or more input devices 30 (FIG. 1). In various implementations, the encoder 40 is configured to directly communicate with the input devices 30 via the peripheral bus 50. In particular implementations, the peripheral bus 50 includes a peripheral component interconnect (PCI) or a universal serial bus (USB) input port. The peripheral bus 50 is configured to support bidirectional audio and bidirectional video exchange with the input device(s) 30 and bidirectional exchange of IP-based control signals or balun-based control signals with the input device(s) 30. In some particular cases, the control signals (e.g., IP-based or balun-based) include human interface device (HID) control signals and/or USB video device class (UVC) control signals. In some cases, balun-based control signals are beneficial for connecting peripheral devices to the input and output signals from the encoder 40. For example, it may be beneficial to use a balun connection for devices that directly connect with the encoder 40 and/or decoder 80. In other cases, IP-based control signals are beneficial in connecting between or within the larger device groups in a room.

The peripheral bus 50 is connected with the hub controller 210, e.g., via any connection described herein. In some cases, where the peripheral bus 50 includes a USB input bus, the hub controller 210 is connected with the peripheral bus 50 over a USB connection such as a USB 3.1 connection. The hub controller 210 can include a USB hub that allows for multiple USB devices to connect with each other. For example, for USB-C devices, the hub controller 210 includes a multiplexer (mux) to allow for reversal of USB-C connectors.

The processor 220 is configured to receive data from the hub controller 210 and perform various processes. In particular, the processor 220 is configured to:

i) receive audio data and video data from the input device(s) 30 (FIG. 1) connected with the peripheral bus 50, via the hub controller 210;

ii) convert the audio data for transmission over an audio over IP connection or balun connection, and convert the video data for transmission over a video over IP connection or balun connection; and iii) transmit the converted video data to the output device(s) 90 (FIG. 1) via the MAIOP 230. In some cases, as noted herein, the MAIOP 230 is coupled with the decoder 80 (FIG. 1) for decoding the converted audio data and the converted video data before output at the output device(s) 90. In additional implementations, the converted audio data and the converted video data are transmitted simultaneously to one or more of the output devices 90.

As noted herein, in various implementations, the processor 220 is configured to receive audio data in the form of analog audio data, IP encoded audio data (Dante), digitally encoded audio data (Audio over USB), and/or digitally embedded audio data. The processor 220 can include one or more codecs and/or chips (or chipsets) configured to convert the audio data for transmission over the audio over IP connection or the balun connection. Similarly, the processor 220 can include one or more codecs and/or chips (or chipsets) configured to convert received video data from the input device 30 (e.g., computing device(s)) for transmission over the video over IP connection or the balun connection. In some cases, the video data is converted from DisplayLink compression format to TMDS (HDMI, DisplayPort, etc.) format. The video data can also be packetized for IP transmission over the video over IP connection or the balun connection. In one example, the processor 220 includes one or more chips configured to convert the received audio data and video data for transmission over the audio over IP connection, video over IP connection and/or the balun connection, such as chip(s) or chipset(s) including Dante, available from the Audinate Company of New South Wales, Australia and/or chip(s) or chipset(s) including DL-6950, available from the DisplayLink Corporation of Palo Alto, Calif., USA.

In particular examples, the audio over IP connection is a Dante connection, and the video over IP connection is a transport connection (e.g., using a compression algorithm such as JPEG2000). In particular cases, the Dante connection can provide reliable, low latency audio interconnectivity with other devices in the system 20, while JPEG2000 can be particularly well suited for transporting high resolution, low latency content. In other examples, the audio over IP connection can include one or more of: AES-67, AVB or AES/EBU connection(s). In other examples, the video over IP connection is configured to transmit video data over formats such as a H.264, H.265, MJPEG, SDVoE, SMPTE2210 and/or NewTek NDI.

The balun connection can include any manner of balun connector (balanced to unbalanced connector) capable of converting between a balanced signal and an unbalanced signal. In one particular example, the balun connection is an HDBaseT connection (e.g., an HDBaseT wire or other connector complying with standards established by the HDBaseT Alliance). In another example, the balun connection includes a fiber optic connection.

In some implementations, the multimedia audiovisual interface output port (MAIOP) 230 includes a high definition multimedia interface (HDMI) output port. In particular cases, the MAIOP 230 is connected with the output device 90 (FIG. 1), which in certain cases, includes an audio digital signal processor.

Additional components shown in the data flow 200 as interacting with the encoder 40 include a video compressor 240 coupled with the processor 220 for compressing video files sent to a network switch 60. In one example, the video compressor 240 can be configured to compress video files received via the processor 220 to a JPEG standard (defined by the Joint Photographic Experts Group), such as the JPEG2000 standard. In particular examples, the video compressor 240 can also include an audio-visual (AV) to IP encoder such as an HDBaseT encoder.

The video compressor 240 is coupled with the network switch 60, which can include a network switch capable of data transmission at a rate of approximately one (1) Gbps up to 100 Gbps (e.g., in both copper and fiber variants). Some particular examples of the network switch 60 are configured for data transmission at a rate of approximately one Gbps. Other particular examples of the network switch 60 are configured for data transmission at a rate of approximately 10 Gbps (e.g., Software Defined Video Over Ethernet (SD-VoE)). In some examples, the processor 220 sends signals to the video compressor 240 over a conventional audiovisual connection, e.g., a DisplayPort connection, a USB-C connection, a DVI-D connection. In some particular cases, the processor 220 sends signals to the video compressor 240 over an HDMI connection. In other particular cases, the processor 220 sends signals to the video compressor 240 over an additional encoding framework, e.g., YUV format or RGB format.

The network switch 60 is further coupled with a device controller (DC) 250, for sending and receiving network and network configuration commands. In some cases, the device controller 250 can include an Acorn chip, ARM chip or Atom chip (available from Intel Corporation, Santa Clara, Calif.) for performing various processing functions described herein. The network switch 60 is additionally coupled with a video decoder (e.g., RTSP decoder, or another video decoder using SMPTE2022/2110 and/or NDI coding standards) 260, which is connected with a camera controller (e.g., UVC controller) 270. The camera controller 270 is additionally connected with the hub controller 210, as well as the device controller 250. In some cases, the camera controller 270 is configured to send camera control commands (e.g., UVC commands) to the device controller 250. The network switch 60 and the processor 220 are both configured to send and receive commands from a processor hub (P. Hub) chip 280. In some cases, the processor hub chip 280 includes a control chip such as the Dante Ultimo chip (e.g., 4×4), available from the Audinate Company. The processor hub chip 280 can be configured to communicate with the processor 220 and the device controller 250 using electrical serial bus interface standards, e.g., i$^2$s with the processor 220 and i$^2$c with the device controller 250. The camera controller 270 can also send signals to the device controller 250 using an electrical serial bus interface standard, e.g., i$^2$c.

The processor 220 can exchange signals with an information technology (IT) network controller 290, which in some cases is controlled by the IT department managing the physical facility or connection infrastructure in the environment 10 (FIG. 1). For example, the processor 220 and network controller 290 can exchange signals using an Ethernet connection.

In some cases, the network switch 60 is connected to one or more room power inputs and outputs, for example, a room (e.g., conference room) input 300 and a room (e.g., conference room) output 310. In some cases, the input 300 and output 310 are power over Ethernet (POE) connections, which can enable power without direct access to an outlet (e.g., over a CATx network cable). In particular examples, the network switch 60 can be connected with the room input 300 by a network with POE connection, and can be connected with the room output 310 by a network connection. In certain cases, the input 300 is coupled with a POE supply (POE) 320, that is supplied with power, e.g., from a source (PS) 330 (e.g., a DC power source). In certain cases, this architecture enables a second apparatus to be daisy-chained by coupling that second apparatus to the room output 310 and connecting the PS 330 to the second apparatus.

In various implementations, the processor 220 is configured to send a wake command and/or an OFF command to the output device 90 (FIG. 1) in response to detecting a connection with the input device 30 at the peripheral bus 50. That is, when a user connects an input device 30 to the peripheral bus 50, the processor 220 receives a signal (e.g., via the hub controller 210) indicating that the input device 30 is connected, and sends a wake command (e.g., via the MAIOP 230), e.g., over the HDMI connection, to the output device 90 (e.g., to awaken a monitor, speaker system, computing device, etc.).

In additional implementations, the processor 220 is configured to simultaneously transmit the converted audio data and the converted video data to the output device 90 via the MAIOP 230 (e.g., over HDMI connection) in response to detecting a signal between the input device 30 and the encoder 40 at the peripheral bus 50. That is, the processor 220 is configured to detect synchronization between the input device 30 and the encoder 40 using the signal received at the peripheral bus 50, and in response to detecting this signal (e.g., via hub controller 210), the processor 220 sends both the converted audio data and the converted video data to the output device 90 via the MAIOP 230.

In various implementations, the processor 220 works in conjunction with the video compressor 240 to compress the converted video data for transmission over the balun connection or the video over IP connection. In particular cases, the converted video data is compressed for transmission over the balun connection or the video over IP connection at a rate of approximately one (1) gigabit per second (Gbps) or less.

Figure 3:
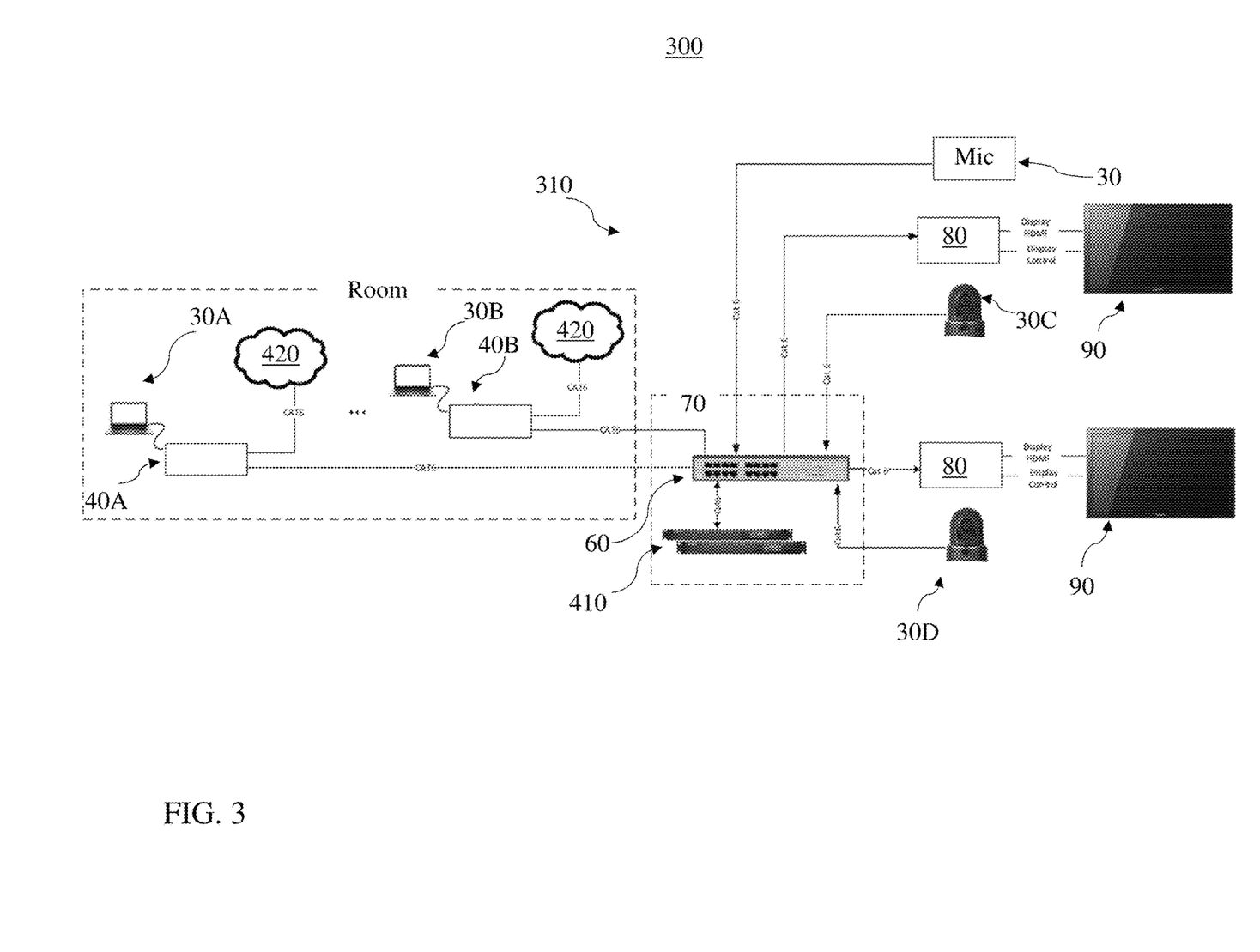
FIG. 3 illustrates a data flow in an example environment according to various implementations.

FIG. 3 illustrates a data flow in an example environment 300 including a system 310 with a set of encoders 40 (two shown, 40A and 40B) each having a primary peripheral bus 50, as described with reference to FIG. 2. In this example environment 300, input devices 30A, 30B are connected with encoders 40A, 40B (e.g., tableside devices) that directly couple with the network switch 60 (e.g., in a rack 70 or other housing). In some cases, the network switch 60 is also coupled with an audio processor 410, which can include one or more controllers and/or processors described with respect to the data flow in FIG. 2, e.g., the processor 220 and the processor hub 280. The network switch 60 in this example can include POE or other power connections described herein. The respective encoders 40A, 40B are connected to a local area network (LAN) 420, as described with respect to FIG. 2 (IT network control 290). A plurality of additional input devices 30C, 30D are also shown coupled with the network switch 60, e.g., a microphones and cameras in the room (or in one or more additional rooms). Each output device 90 is shown connected with a respective decoder 80.

In the scenario depicted in FIG. 3, multiple input devices 30A, 30B such as computing devices, as well as additional input devices 30C, 30D such as cameras, can be connected with the encoders 40 and/or network switch 60 for controlling communications in the system 310. Two output devices 90 (e.g., displays) are shown connected with corresponding decoders 80 in this example. In some cases, this example environment 300 depicts a multi-user BYOC or BYOD configuration, whereby two or more users can control communications between two or more input devices 30A, 30B and at least one output device 90 using the respective selected input device 30. In these scenarios, the computing device that acts as an input device is provided by each user, and in some cases, is the personal computing device (e.g., laptop, tablet or other smart device) belonging to or otherwise associated with each user.

Multi-user scenarios can present challenges in terms of which user's content takes precedent over the other user(s), as well as which of the users can control the communication and presentation of content. Various implementations are configured to address multi-user scenarios such as those depicted in the example of FIG. 3. For example, with reference to FIGS. 2 and 3, the processor 220 runs on the audio processor 410 or the encoder 80, and is configured to control priority of user content in the system 310. In particular cases, the processor 220 is configured to detect a connection with an additional input device 30B at the corresponding peripheral bus 50 on encoder 40B (in addition to input device 30B at the peripheral bus 50 on encoder 40A). In response to detecting that additional connection, the processor 220 is configured to:

iv) receive additional audio data and additional video data from the additional input device 30B connected with the additional encoder 40B, via the hub controller 210;

v) convert the additional audio data for transmission over the audio over IP connection or the balun connection and convert the additional video data for transmission over the video over IP connection or the balun connection; and vi) transmit the converted additional audio data and the converted additional video data to the output device(s) 90 via the MAIOP 230 (FIG. 2) in response to determining that the additional input device 30B has priority over the input device 30A.

It is understood that the network switch 60 can have a plurality encoder connections, which can provide for connection with several (or more) input devices 30 via corresponding encoders 40. The illustration of two encoders 40A, 40B is merely intended to illustrate aspects of connection control amongst a plurality of input devices 30.

Determining priority between input devices 30 can be performed according to various implementations. The processor 220 can be configured to detect characteristics of the input sources to encoders 40A, 40B and transmit the converted audio data from one of those input sources to the output devices based upon those detected characteristics. In various implementations, the processor 220 includes logic for determining priority between input devices 30 according to one or more priority rules.

For example, the processor 220 can be configured to determine priority between respective input devices 30 based upon priority rules including at least one of: a) a seat location of the input device 30A as compared with a seat location of the additional input device 30B, b) an order of connection with the encoders 40A, 40B, c) a predefined hierarchy of users associated with the input device 30A and the additional input device 30B, d) a connection method for the input device 30A as compared with a connection method for the additional input device 30B, e) a device type of the input device 30A as compared with a device type of the additional input device 30B, or f) presence of a static device connected to the encoder(s) 40A, 40B.

With continuing reference to FIGS. 2 and 3, in particular examples, the processor 220 includes logic that associates known locations of the encoders 40A, 40B, etc. with a priority rule. For example, a first encoder 40A is associated with a primary seating location (e.g., a head seat at a conference room table), while a second encoder 40B is associated with a secondary seating location (e.g., a location along the sides of the table). The processor 220 can be configured to detect connection with input devices 30 at both encoders 40A, 40B, and according to the seat location priority rule, transmit the converted audio and video data from the input device 30 connected with the primary seating location so long as that input device 30 remains connected to the corresponding encoder (via the peripheral bus 50). In certain cases, this seating location rule can supersede an order of connection or other rule, such that regardless of when the prioritized input device 30 is connected at the peripheral bus 50 at encoder 40, the content from that input device 30 is prioritized over the input device connected to the additional encoder(s) in the system 310.

In still other examples, the order of connection between two input devices 30 dictates the priority of content transmission. For example, the processor 220 can include logic that associates connection order at the encoders 40A, 40B with priority of audio and video data transmission. In these cases, the processor 220 detects connection of an input device 30A with the peripheral bus 50 (via hub controller 210) at an encoder 40A, and transmits the audio and video data to one or more output devices 90, as described herein. When the processor 220 detects connection of a second input device 30B (e.g., at the peripheral bus 50 of an additional encoder 40B), the processor 220 is configured to prioritize content from the first input device 30A over the second input device 30B. In one scenario, the priority rule gives priority to the earliest, or first, connection that is still in place, and even when the second input device 30B connects to the second encoder 40B, the processor 220 continues to transmit content from the first input device 30A (unless superseded by another rule or command). In another scenario, the priority rule gives priority to the later, or last, connection that is still in place, and when the second input device 30B connects to the second encoder 40B, the processor 220 stops transmitting content from the first input device 30A and switches to transmitting content from the second input device 30B to the output device(s) 90.

In still other examples, the processor 220 includes logic assigning users of input devices 30 with one or more levels of priority. In these cases, the logic assigns absolute or relative priority to one or more users associated with respective input devices 30, e.g., personal computing devices such as laptops, tablets, smart devices, etc. In some cases, the processor 220 is configured to detect identification characteristics of the input device 30 after it is connected to one of the encoders 40A, 40B, and based upon the identification characteristics, either transmit the converted audio and video data associated with that input device 30 to the output device(s) 90 or transmit converted audio and video data associated with another input device 30 to the output device(s) 90. In some cases, the processor 220 is configured to identify IP addresses or numbers of the input devices 30 and check those addresses/numbers against known priority characteristics to prioritize content (e.g., IP address/number assigned to a user with higher relative priority than IP address/number assigned to user with lower relative priority). In additional cases, the processor 220 is configured to identify the device(s) 30 using device IDs assigned by the control software, e.g., stored in a database or otherwise accessible to the processor 220.

In one example, the input device 30 of a first user may have absolute priority over input devices 30 of all secondary users, while a first one of the secondary users may have relative priority over another one of the secondary users. In this scenario, when the first user connects his/her associated input device 30 in the peripheral bus of an encoder (e.g., encoder 40A), that input device 30 takes priority over all other user input devices 30 connected at other encoders (e.g., encoders 40B, 40B, 40C, etc.). However, when the first user is not connected and two secondary users are connected to encoders 40 via corresponding peripheral buses (e.g., peripheral bus 50A, and additional peripheral buses not depicted, such as a peripheral bus 50B, peripheral bus 50C, etc.), audio and video data from the input device 30 associated with a user having the highest priority is converted and transmitted in place of content from input device(s) 30 of other secondary users.

In still other examples, the processor 220 is configured to prioritize transmission of content from input devices 30 based upon a connection method. For example, where the peripheral buses 50 at corresponding encoders 40 have distinct connection capabilities, the processor 220 can include logic for prioritizing one or more type(s) of connection over the other(s). In particular examples, a first peripheral bus 50 at encoder 40A can include a PCI input port, while an additional peripheral bus 50 at encoder 40B can include a USB input port. The logic in processor 220 can be configured to detect connection at both encoders 40A, 40B, and according to priority rules based upon connection type, transmit the converted audio and video data to the output device(s) 90 from the input device 30 connected with encoder 40A or encoder 40B. In certain cases, priority is given to USB connection, and when the processor 220 detects connection at two distinct types of peripheral bus 50, one of which is a USB connection, the processor 220 gives priority to the input device 30 at that USB input port.

In additional examples, the processor 220 is configured to prioritize transmission of content from input devices 30 based upon a type of the input device. For example, where the types of input devices 30 connected with the encoder 40 differ, the processor 220 can include logic for prioritizing one or more type(s) of device over the other(s). In particular examples, the input device 30 connected to the peripheral bus 50 at an encoder 40 is a laptop or tablet, while the input device 30 connected to the peripheral bus 50 at another encoder 40 is a smartphone. The logic in processor 220 can be configured to detect connection at both encoders 40, detect the type of input device 30 at each connection (e.g., based upon known device type, such as stored in a database or other accessible data structure) and according to priority rules based upon device type, transmit the converted audio and video data to the output device(s) 90 from the input device 30 at the prioritized encoder 40. In certain cases, priority is given to laptops or tablets over smartphones, and when the processor 220 detects the device connection of a laptop or tablet at one encoder 40A and device connection of a smartphone at the additional encoder 40B, the processor 220 gives priority to the input device 30A connected at the encoder 40A.

In additional examples, priority rules in the logic within processor 220 give priority to a static input device 30 connected to the encoder 40 as compared with other input devices 30 that do not have a static connection. For example, one of the input devices 30 can include a desktop, tabletop or other computing device that is physically connected with the environment 300 (FIG. 3). In this case, the input device 30 is constantly connected with the encoder 40, e.g., via a static connection with peripheral bus 50. When the processor 220 detects an additional input device 30 connection (e.g., via one or more encoders), the logic in processor 220 is configured to give priority to the content from the input device 30 connected with the prioritized encoder 40.

It is understood that two or more priority rules can be combined or otherwise conditional upon each other. In these cases, the logic in processor 220 can be structured in algorithmic form to make priority decisions based upon a plurality of rules, e.g., user hierarchy, connection method, connection order, etc. Additionally, the user of an input device 30 is also able to defer or adjust priority of content according to one or more rules. In some cases, the user of the prioritized input device 30 is able to defer priority or otherwise modify priority to give control of content communication to other device users.

Figure 4:
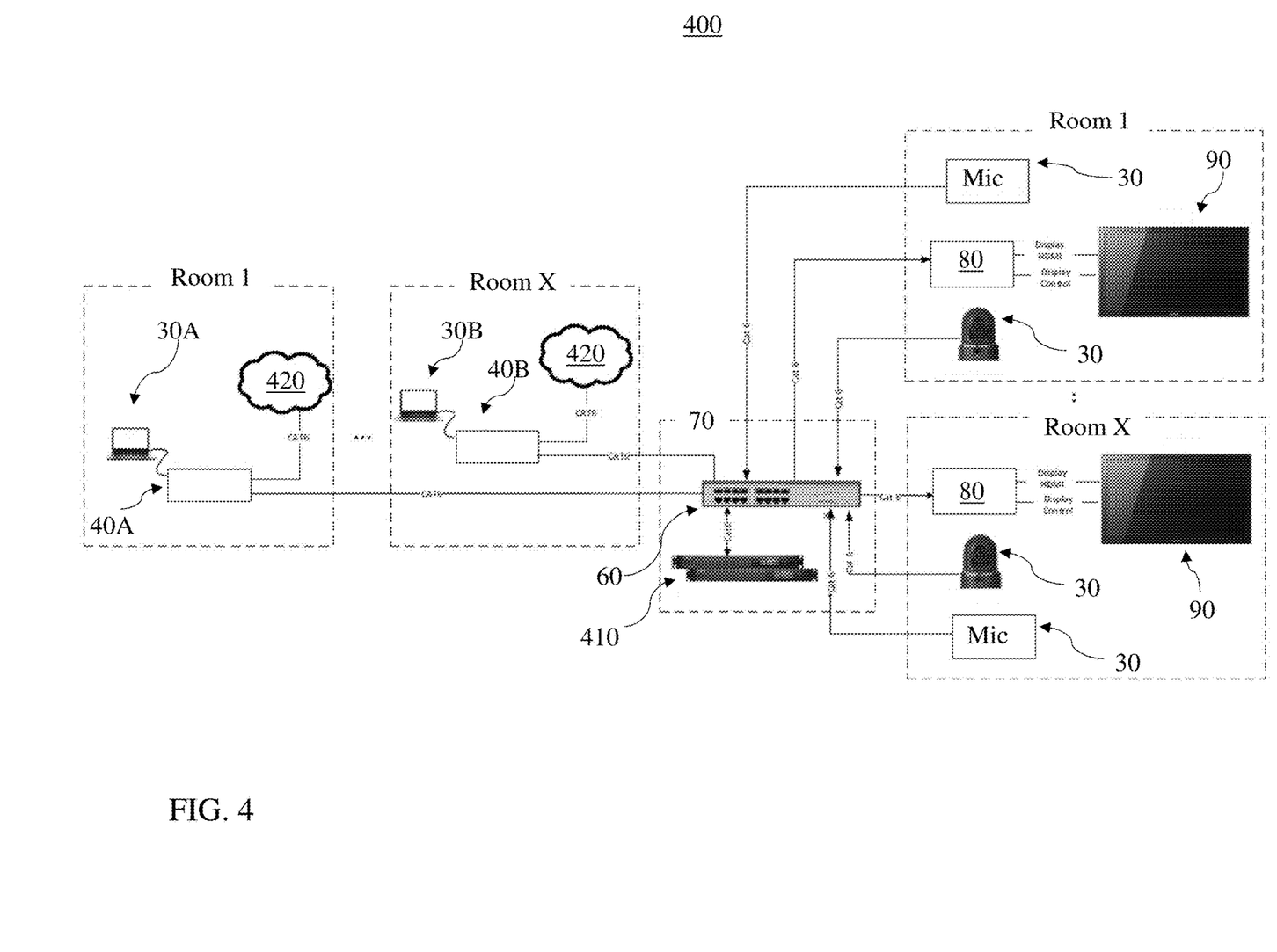
FIG. 4 shows data flows in an example environment according to various further implementations.

FIG. 4 illustrates an additional data flow in an example environment 400 according to various implementations. This data flow depicts distinct input devices 30A, 30B (e.g., computing devices) in a divisible room scenario (environment 400). As shown in environment 400, input devices 30A, 30B are each coupled to respective encoders 40A, 40B, which are in turn coupled with the network switch 60. In some cases, the network switch 60 is also coupled with the audio processor 410, which can include one or more controllers and/or processors described with respect to the data flow in FIG. 2, e.g., the processor 220 and the processor hub 280. The network switch 60 in this example can include POE or other power connections described herein. The respective encoders 40A, 40B are connected to the local area network (LAN) 420, as described with respect to FIG. 2 (IT network control 290). A plurality of additional input devices 30 are also shown coupled with the network switch 60, e.g., a microphones and cameras in the separate rooms. Each output device 90 is shown connected with a respective decoder 80 in the respective rooms. This example configuration can allow users to control communications in a room that is divisible into multiple smaller rooms, e.g., from 1-4 distinct spaces, or Room 1 through Room X. Each room can have an associated decoder 80 and output device 90 (e.g., audio and video output device) for receiving and outputting the converted audio data and video data from the encoder(s) 40. However, it is understood that the rooms need not necessarily have a one-to-one connection, such that one room (e.g., Room 1) can be connected (via network switch 60) with one or more additional rooms (e.g., Rooms 2, 3, etc.). That is, each room depicted in FIG. 4 can have either a one-to-one connection, or a one-to-many connection. Additionally, this divisible room scenario depicted in FIG. 4 is not limited to equally divided rooms or proportionally distributed input devices to output devices. That is, one or more input devices 30 can be connected with one or more output devices 90 in disproportionate arrangements between rooms.

As described herein, the encoder 40 (e.g., FIG. 1) is configured to control operation of at least one output device 90 (e.g., a display, speaker system, and/or computing device, etc.). In some implementations, the encoder 40 is configured to control operations, e.g., between input devices 30, the network switch 60, the decoder 80 and/or the output device(s) 90, with one or more software functions such as programming instructions stored in one or more chips or chipsets described herein. However, in other implementations, the encoder 40 is configured to control operations, e.g., between input devices 30, the network switch 60, the decoder 80 and/or the output device(s) 90, using an IP-based secondary control platform. Examples of IP-based secondary control platforms can include Crestron control systems (available from the Crestron Electronics Company of Rockleigh, N.J.), a tablet-based control platform, or a remote software control platform.

As noted herein, in contrast to conventional approaches, various implementations allow for control of both audio and video communications between input devices and output devices over a single device input connection. That is, both audio and video data are transmitted through the single device input connection (e.g., peripheral bus 50, FIG. 2)), converted into appropriate output formats, and routed to respective output devices (e.g., output devices 90, FIG. 1). This can significantly improve the user experience as compared with the conventional systems and approaches.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. An encoder for distributing multimedia communications signals to enable sharing of multimedia content between users in a presentation setting, the encoder comprising:
   a peripheral bus input port;
   a hub controller coupled with the peripheral bus input port;
   a processor coupled with the hub controller; and
   a multimedia audiovisual interface output port coupled with the processor,
   wherein the processor is configured to:
      receive both audio data and video data from a first input device connected with the peripheral bus input port, via the hub controller, wherein the first input device is associated with a first user providing content in the presentation setting;
      convert the audio data for transmission over an audio over internet protocol (IP) connection or a balun connection and convert the video data for transmission over a video over IP connection or the balun connection; and
      transmit the converted audio data and the converted video data to at least one output device connected with the multimedia audiovisual interface output port, wherein the at least one output device enables audio output of the converted audio data and video output of the converted video data to one or more additional users distinct from the first user,
   wherein the peripheral bus input port is configured to support both bidirectional audio and bidirectional video exchange with the first input device and also support bidirectional exchange of IP-based control signals or balun-based control signals with the first input device,
   wherein the peripheral bus input port comprises a peripheral component interconnect (PCI) or a universal serial bus (USB) input port, wherein the peripheral bus input port is the only physical connection between the first input device and the encoder, wherein the processor is configured to simultaneously transmit the converted audio data and the converted video data to the at least one output device, via the multimedia audiovisual interface, in response to detecting a signal between the first input device and the encoder at the peripheral bus input port, and
   wherein the peripheral bus input port enables the first user to provide the content to the one or more additional users with only a single device connection at the connection between the first input device and the encoder.

2. The encoder of claim 1, wherein the audio over IP connection comprises a Dante connection, and wherein the video over IP connection comprises a transport connection.

3. The encoder of claim 1, wherein the processor is further configured to send a mute command to the at least one output device in response to detecting the connection with the first input device at the peripheral bus input port.

4. The encoder of claim 1, wherein the converted video data is compressed for transmission over the video over IP connection or the balun connection at a rate of approximately one gigabit per second (Gbps) to approximately 100 Gbps.

5. The encoder of claim 1, wherein the multimedia audiovisual interface output port comprises a high definition multimedia interface (HDMI) output port, and wherein the at least one output device comprises an audio digital signal processor.

6. The encoder of claim 1, wherein the first input device is a bring-your-own-codec (BYOC) device or a bring-your-own-device (BYOD) device.

7. The encoder of claim 6, wherein the first user and the one or more additional users are in distinct physical locations.

8. The encoder of claim 7, wherein the video data comprises a video feed detected by a camera on the first input device and wherein the audio data comprises an audio feed detected by a microphone on the first input device.

9. A system for enabling sharing of multimedia content between users in a presentation setting, the system comprising:
   an encoder comprising:
      a peripheral bus input port;
      a hub controller coupled with the peripheral bus input port;
      a processor coupled with the hub controller; and
      a multimedia audiovisual interface output port coupled with the processor,
      wherein the processor is configured to:
         receive both audio data and video data from a first input device connected with the peripheral bus input port, via the hub controller wherein the first input device is associated with a first user providing content in the presentation setting;
         convert the audio data for transmission over an audio over internet protocol (IP) connection or a balun connection and convert the video data for transmission over a video over IP connection or the balun connection; and
         transmit the converted audio data and the converted video data to at least one output device,
      wherein the peripheral bus input port is configured to support both bidirectional audio and bidirectional video exchange with the first input device and also support bidirectional exchange of IP-based control signals or balun-based control signals with the first input device,
      wherein the peripheral bus input port comprises a peripheral component interconnect (PCI) or a universal serial bus (USB) input port, wherein the peripheral bus input port is the only physical connection between the first input device and the encoder, wherein the processor is configured to simultaneously transmit the converted audio data and the converted video data to the at least one output device, via the multimedia audiovisual interface, in response to detecting a signal between the first input device and the encoder at the peripheral bus input port, and wherein the peripheral bus input port enables the first user to provide the content to one or more additional users, distinct from the first user, with only a single device connection at the connection between the first input device and the encoder;
   a decoder coupled with the multimedia audiovisual interface output port for decoding the converted audio data and the converted video data; and
   at least one output device coupled with the decoder for providing audio output of the converted audio data and video output of the converted video data to the one or more additional users.

10. The system of claim 9, wherein the set of output devices, the encoder and the decoder are located in the same room.

11. The system of claim 9, wherein the audio over IP connection comprises a Dante connection, and wherein the video over IP connection comprises a transport connection.

12. The system of claim 9, wherein the processor is further configured to send a mute command to the at least one output device, via the decoder, in response to detecting the connection with the first input device at the peripheral bus input port.

13. The system of claim 9, further comprising:
an additional encoder;
a network switch coupled with the encoder, the additional encoder, and the decoder; and
an audio processor coupled with the network switch,
wherein the audio processor or the decoder comprises a processing component that is configured, in response to detecting a connection with an additional input device at the additional encoder, to:
receive both additional audio data and additional video data from the additional input device connected with the additional encoder;
convert the additional audio data for transmission over the audio over IP connection or the balun connection and convert the additional video data for transmission over the video over IP connection or the balun connection; and
transmit the converted additional audio data and the converted additional video data to the at least one output device, via the decoder, in response to determining that the additional input device has priority over the first input device,
wherein priority between the first input device and the additional input device is determined based upon at least one of: a seat location of the first input device as compared with a seat location of the additional input device, an order of connection with the encoder, a connection method for the first input device as compared with a connection method for the additional input device, a device type of the first input device as compared with a device type of the additional input device, or presence of a static device connected to the encoder.

14. The system of claim 9, wherein the converted video data is compressed for transmission over the video over IP connection or the balun connection at a rate of approximately one gigabit per second (Gbps) to approximately 100 Gbps.

15. The system of claim 9, wherein the multimedia audiovisual interface output port comprises a high definition multimedia interface (HDMI) output port, and wherein the at least one output device comprises an audio digital signal processor.

16. The system of claim 9, wherein the first input device is a bring-your-own-codec (BYOC) device or a bring-your-own-device (BYOD) device.

17. The system of claim 16, wherein the first user and the one or more additional users are in distinct physical locations.

18. The system of claim 17, wherein the video data comprises a video feed detected by a camera on the first input device and wherein the audio data comprises an audio feed detected by a microphone on the first input device.

19. A computer-implemented method of controlling a device connection to enable sharing of multimedia content between users in a presentation setting, the system, the method comprising:
at an encoder:
receiving both audio data and video data from a first input device connected with a peripheral bus input port, wherein the first input device is associated with a first user providing content in the presentation setting;
converting the audio data for transmission over an audio over internet protocol (IP) connection or a balun connection and converting the video data for transmission over a video over internet protocol (IP) connection or the balun connection; and
transmitting the converted audio data and the converted video data for decoding and output to at least one output device via a multimedia audiovisual interface output port, wherein the at least one output device enables audio output of the converted audio data and video output of the converted video data to one or more additional users distinct from the first user,
wherein the peripheral bus input port is configured to support both bidirectional audio and bidirectional video exchange with the first input device and also support bidirectional exchange of IP-based control signals or balun-based control signals with the first input device,
wherein the peripheral bus input port comprises a peripheral component interconnect (PCI) or a universal serial bus (USB) input port, wherein the peripheral bus input port is the only physical connection between the first input device and the encoder, wherein the encoder is configured to simultaneously transmit the converted audio data and the converted video data to the at least one output device, via a multimedia audiovisual interface, in response to detecting a signal between the first input device and the encoder at the peripheral bus input port, and
wherein the peripheral bus input port enables the first user to provide the content to the one or more additional users, distinct from the first user, with only a single device connection at the connection between the first input device and the encoder.

20. The method of claim 19, wherein the first input device is a bring-your-own-codec (BYOC) device or a bring-your-own-device (BYOD) device, wherein the first user and the one or more additional users are in distinct physical locations, and wherein the video data comprises a video feed detected by a camera on the first input device and wherein the audio data comprises an audio feed detected by a microphone on the first input device.

* * * * *